Feb. 24, 1925.　　　　　C. A. HOXIE　　　　　1,527,649
TELEPHONY
Filed May 20, 1921
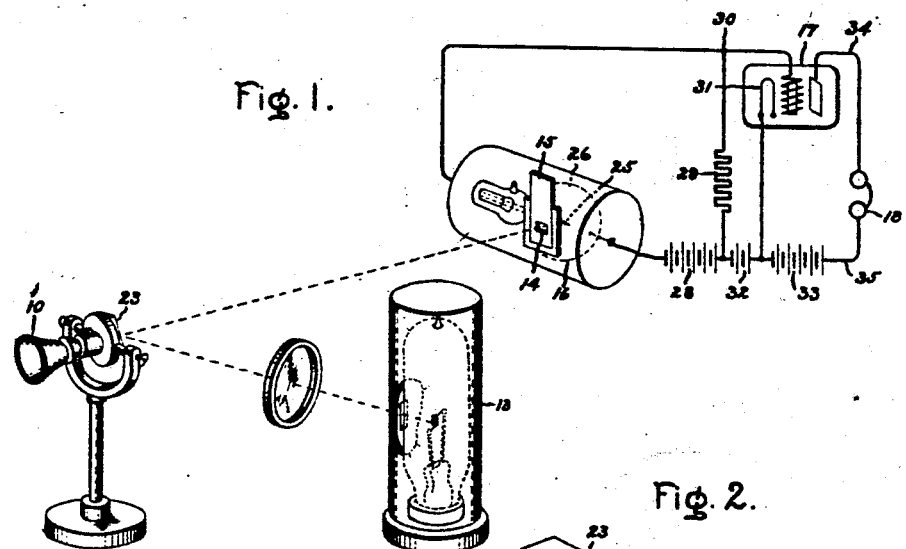
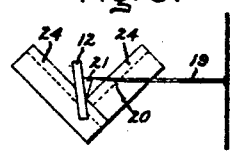
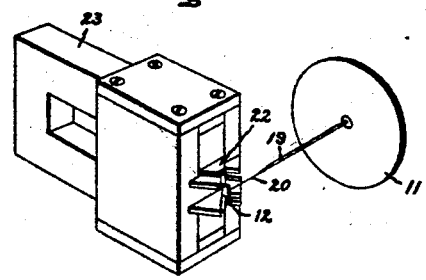
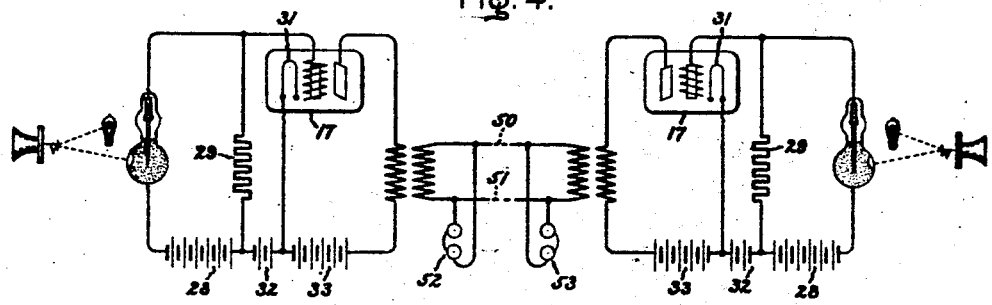
Inventor:
Charles A. Hoxie,
by Albert G. Davis
His Attorney.

Patented Feb. 24, 1925.

1,527,649

UNITED STATES PATENT OFFICE.

CHARLES A. HOXIE, OF SCHENECTADY, NEW YORK, ASSIGNOR TO GENERAL ELECTRIC COMPANY, A CORPORATION OF NEW YORK.

TELEPHONY.

Application filed May 20, 1921. Serial No. 471,228.

*To all whom it may concern:*

Be it known that I, CHARLES A. HOXIE, a citizen of the United States, residing at Schenectady, in the county of Schenectady, State of New York, have invented certain new and useful Improvements in Telephony, of which the following is a specification.

This invention relates to an improved method and apparatus for transmitting sound.

According to its preferred embodiment, means is provided whereby vibrations are imparted to a beam of light corresponding to the vibrations of the sound waves which it is desired to transmit. A screen is provided to partially intercept this beam and the remainder of the beam is received by a photo-electric cell, the vibrations of the beam causing a variation in the illumination of the cell. The cell is connected in series with a source of current and the changes of illumination cause variations in current therethrough which ultimately serve to produce vibrations of the diaphragm at the receiving end of the line.

I am aware that various attempts have been made to transmit sound by light waves which are received by some device sensitive thereto, but so far as I am aware all have failed to accomplish the results sought because the means employed have not been sufficiently responsive to the impulses received, with the actual result that the sounds produced have been greatly distorted. Thus, when the apparatus has included a selenium cell which has been relied upon to convert changes of light corresponding to the vibrations of complex sounds such as those of the human voice into changes in current, it has been found that the cell is much more responsive to the low frequency components of the light vibrations than to the high frequency components. I have, however, succeeded by means of the apparatus hereinafter described in transmitting sounds of this character, and reproducing them without an appreciable change.

Important among the factors which contribute to the success of my apparatus is the use of a photo-electric cell and the use of this cell in combination with a vacuum tube amplifier. The cell employed by me is adapted to cause changes in current corresponding strictly to the changes in light to which the cell is subjected regardless of the rate at which these changes occur. The vacuum tube amplifier serves to produce a current which differs from the current through the cell only by being of sufficient amplitude for transmission and the actuation of the receiving instruments.

Other objects and advantages of my invention will appear from the following description taken in connection with the accompanying drawing wherein Fig. 1 shows diagrammatically a telephone system embodying my invention; Fig. 2 is a perspective view of the sound receiving diaphragm and the mirror connected therewith; Fig. 3 is an enlarged detail view of the diaphragm and mirror showing in particular the mounting of the shaft which carries the mirror; Fig. 4 is a diagrammatic view of a telephone system adapted for transmission of speech in both directions.

As shown in Fig. 1 a transmitter 10 is provided with a diaphragm 11 to which is secured a mirror 12. Light from a suitable source 13 is reflected from the mirror 12, and passes through a slot 14 formed in a screen 15 into a photo-electric cell 16. The cell is connected to the grid circuit of a vacuum tube amplifier 17 in the plate circuit of which is included a telephone receiver 18.

Referring more particularly to the elements shown diagrammatically in Fig. 1, the diaphragm 11 and mirror 12 are connected as shown in Figs. 2 and 3 by means of rods 19 and 20, the rod 20 being made thin at its outer end so as to be flexible. Mirror 12 is mounted on a triangular shaft 21 held in bearings 22 by means of a permanent magnet 23. The bearing surfaces are each formed of jewels 24. Vibration of the diaphragm 11 results in the tilting of the shaft 21 and consequently the tipping of the mirror 12.

The photo-electric cell which I employ preferably comprises a sealed tube having a central anode 25 and a cathode 26, the latter consisting of a coating of silver which has been formed on the wall of the tube and upon which has been deposited metallic potassium. Before final sealing the tube is subjected to a Geisler discharge in an atmosphere of hydrogen. An opening in the cathode is left to provide a window for the passage of the light which falls upon the interior surface of the cathode.

This cell may be conveniently made by exhausting the tubes and evaporating within the same a quantity of metallic potassium which is condensed upon the internal walls, a suitable barrier being provided to prevent its condensation over the surface which it is designed to preserve as a window. 100 microns of hydrogen are then admitted to the tube and the light sensitive potassium cathode is "formed" by connecting the tube in series with a resistance of about 10,000 ohms to a 500 volt source of potential which will pass about 33 milliamperes through the tube in the form of a bluish discharge. In this operation the potassium constitutes the cathode. The result produced is an increase in the sensitiveness of the tube. If desired, the sensitiveness may be still further increased by introducing new hydrogen and again submitting the tube to discharge. Finally the hydrogen is removed and argon gas is admitted, the pressure of this varying according to working conditions from 12 to 200 microns. The lower pressures are used with higher impressed potentials to give the tube a greater stability. Such a tube may conveniently be operated at potential differences of between 50 and 500 volts. If desired to increase the sensitivity, more argon may be admitted.

When this cell is placed in series with a suitable source of potential the current therethrough is dependent upon the quantity of light entering the cell or the area of cathode illuminated. It appears that the action of light has the effect of increasing an electron discharge from the cathode to the anode. While I have shown and described one form of photo-electric cell, it is clear that other forms may be used. I intend that the term "photo-electric cell" or photo electric device shall apply to any means of this type through which a current is adapted to flow and which has the property of changing the current passing therethrough in response to any change in the quantity or area of illumination to which the cell is subjected regardless of the rate at which the changes in illumination occur.

In operation the slit 14 in the screen 15 is arranged to permit but a portion of the beam of light from the mirror 12 to enter the photo-electric cell the edge of the beam of light crossing the slit 14 in such a way that the vibrations of the mirror in response to the movements of the diaphragm permit a greater or less quantity of light to fall upon the cathode 26. A circuit through the cell 16 includes a battery 28 and a non-inductive resistance 29, this circuit being in electrical connection with the grid or control circuit of the thermionic vacuum tube device 17 from a point 30 intermediate the resistance 29 and the anode 25. The filament 31 is connected to the opposite end of the resistance, preferably through a few battery cells 32 to maintain the proper difference of potential between the filament and the grid. In certain cases the potential across the resistances 29 is such as to make the use of these battery cells unnecessary. The plate circuit is supplied from a battery 33 and included in the plate circuit are the transmission lines 34 and 35 and the telephone receiver 18.

In practice when sound waves fall upon the diaphragm 11 it is caused to vibrate and these vibrations are communicated to the mirror 12. The diaphragm and mirror are constructed and mounted in such a manner that their movements are in strict accordance with the sound waves impressed upon the diaphragm. In order to accomplish this I construct the moving parts of extremely light mass. The diaphragm is, however, constructed to have but a small amplitude of vibration so as to reduce as much as possible stresses set up in the material of the diaphragm which would cause distortion of the wave form. Movement of the mirror 12 causes the beam of light from source 13 after being reflected to bodily vibrate and by reason of its partial interception by the screen 15 causes a varying area of the cathode surface within the cell 16 to be illuminated with the result that slight changes are produced in current flowing through the cell which correspond strictly to the vibrations of the light beam. It is to be noted that the only operative connection between the sound-receiving means and the device 16 is the beam of light which is without inertia tending to cause distortion of the initial wave form. This means of varying a current in response to sound impulses received by a diaphragm has been found superior to such means as involve merely a mechanical connection between the diaphragm and a current-varying means, such for example as a microphone transmitter, in that the current changes produced in the former are practically free from the effects of incidental vibrations caused by jars to the instrument or its support. The small variations in current through the photo-electric device are amplified without distortion by means of the thermionic vacuum tube device. While I have shown a pliotron as an amplifying means, it is obvious that other means may be employed, such for example as a dynatron. In any such case the photo-electric cell will be arranged so as to affect the control circuit of the amplifier. The amplified current passes over the transmission lines and actuates the receiver 18.

In Fig. 4 I have shown means whereby speech may be transmitted from either end of the line. In this case there is located at each end a transmitting diaphragm and mirror, photo-electric cell and amplifier, all constructed and arranged as shown in Fig. 1. In the plate circuit of each amplifier, however, is the primary of the transformer, the secondaries of which are connected by the transmission lines 50 and 51. Telephone receivers 52 and 53 are bridged across the transformer secondaries.

What I claim as new and desire to secure by Letters Patent of the United States is:

1. In combination, a photo-electric device, a source of light for illuminating said photo-electric device, a diaphragm adapted to be vibrated by sound waves impinging thereon, and means operatively connected with said diaphragm for varying the area of said photo-electric device illuminated by said source of light in accordance with the vibrations of said diaphragm.

2. In combination, a photo-electric device, a source of light adapted to direct a light beam on said photo-electric device, a screen arranged to intercept a portion of said light beam, a diaphragm, and means controlled by said diaphragm for producing relative movement between said light beam and said screen, whereby the area of illumination of said photo-electric device is varied in a manner corresponding with the vibrations of said diaphragm.

3. In combination, a photo-electric device, a source of light adapted to direct a light beam on said photo-electric device, a screen arranged to intercept a portion of said light beam, a diaphragm adapted to receive sound waves, and a member controlled by said diaphragm for deflecting said light beam whereby the amount of light received by said photo-electric device varies in a manner corresponding with the sound waves falling upon said diaphragm.

4. In combination, a photo-electric device, a source of light, a diaphragm adapted to receive sound waves, a pivotally mounted mirror connected to said diaphragm to be rocked thereby, said mirror being adapted to direct light received from said source toward said photo-electric device in the form of a beam, and a screen arranged in the path of said beam to intercept a portion thereof, whereby the area of said photo-electric device illuminated by said beam varies in a manner corresponding with the sound waves falling upon said diaphragm.

5. In combination, a photo-electric device having a cathode responsive to the area thereof illuminated, a window in said photo-electric device, a screen therefor, a source of light, a diaphragm, a pivotally mounted mirror for receiving light from said source and for reflecting it in the form of a beam into said window in a manner to be partly intercepted by an edge of said screen, a connection between said diaphragm and said mirror, and a work circuit including a source of energy connected to said photo-electric cell, whereby vibrations of said diaphragm due to sound waves falling thereon cause similar variations of current in said work circuit.

6. In a device for transmitting sound, means for causing a beam of light to vibrate bodily in a manner corresponding strictly to the sound which it is desired to transmit, a photo-electric device adapted to receive said beam of light and produce in response to the vibrations thereof changes in current corresponding strictly to the vibrations of said beam and means for amplifying said changes of current.

7. A device for transmitting sound comprising a source of light, means for producing a beam of light from said source and causing said beam to vibrate bodily in a manner corresponding to the sound which it is desired to transmit, a vacuum tube amplifier having plate and control circuits, a source of current, a photo-electric cell connected to said control circuit and in series with said source of current, said photo-electric cell being adapted to receive light from said source, means for causing the vibrations of said beam of light to produce changes in the light received by said cell, a sound producing diaphragm and means connected in said plate circuit for actuating said diaphragm.

8. A method of transmitting sound which consists in causing a beam of light to vibrate bodily corresponding to the sound which it is desired to transmit, causing the vibrating beam to produce changes of current corresponding to said vibrations, amplifying said changes in current without distortion and causing the current so amplified to produce sound vibrations.

9. The method of transmitting sound waves by means of a photo-electric device which consists in causing a beam of light to vibrate bodily corresponding to said waves, causing said vibrations to produce variations in the illumination of said device whereby changes of current are produced corresponding to the vibrations of said sound waves, amplifying said changes in current and causing the current as amplified to produce sound vibrations.

10. The method of operating a photo-electric device having a surface sensitive to the action of light and having a screen partially covering said surface, in response to sound vibrations, which consists in projecting a beam of light toward said device in a manner to be partly intercepted by said screen and vibrating said beam in accordance with said sound waves to vary the portion of said beam reaching the sensitive surface of said photo-electric device.

In witness whereof I have hereunto set my hand this 18th day of May, 1921.

CHARLES A. HOXIE.

| Moskowitz | 1,150,953 | 171-229 |
| Dixon | 1,193,999 | 178-88 |
| Dixon | 1,316,699 | 178-88 |
| Berliner | 235,120 | 250-7 |
| Bell | 235,496 | 250-7 |
| Bell et al | 241,909 | 250-7 |
| Bell et al | 235,199 | 250-7 |
| Fessenden | 1,133,435 | 179-171 |
| Case Brit. | 145,169 | 250-7 |
| Coblentz | 1,345,586 | 250-20 |
| Langmuir | 1,275,627 | 250-27 |
| Van der Bijl | 1,369,764 | 84-1 |
| Kunz | 1,381,474 | 250-34 |